May 10, 1938. A. STOCKSTROM 2,117,227
GAS RANGE
Filed Nov. 20, 1931 4 Sheets-Sheet 1
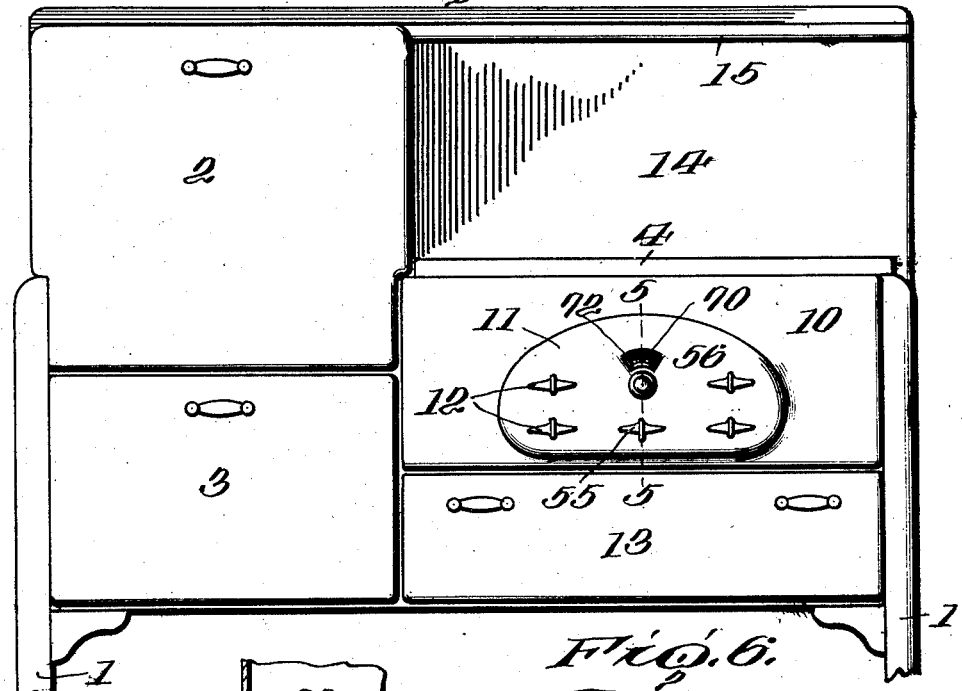
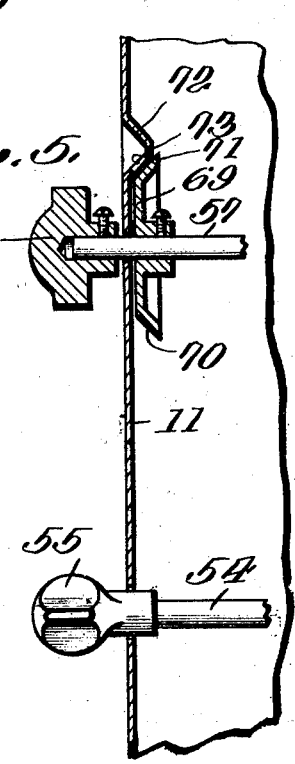
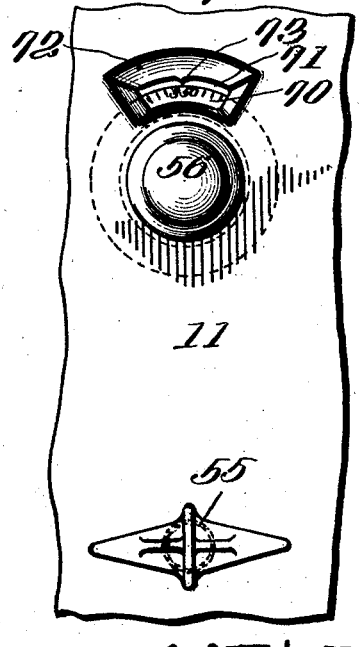
Inventor
A. Stockstrom
By Patterson, Wright & Patterson Attorneys

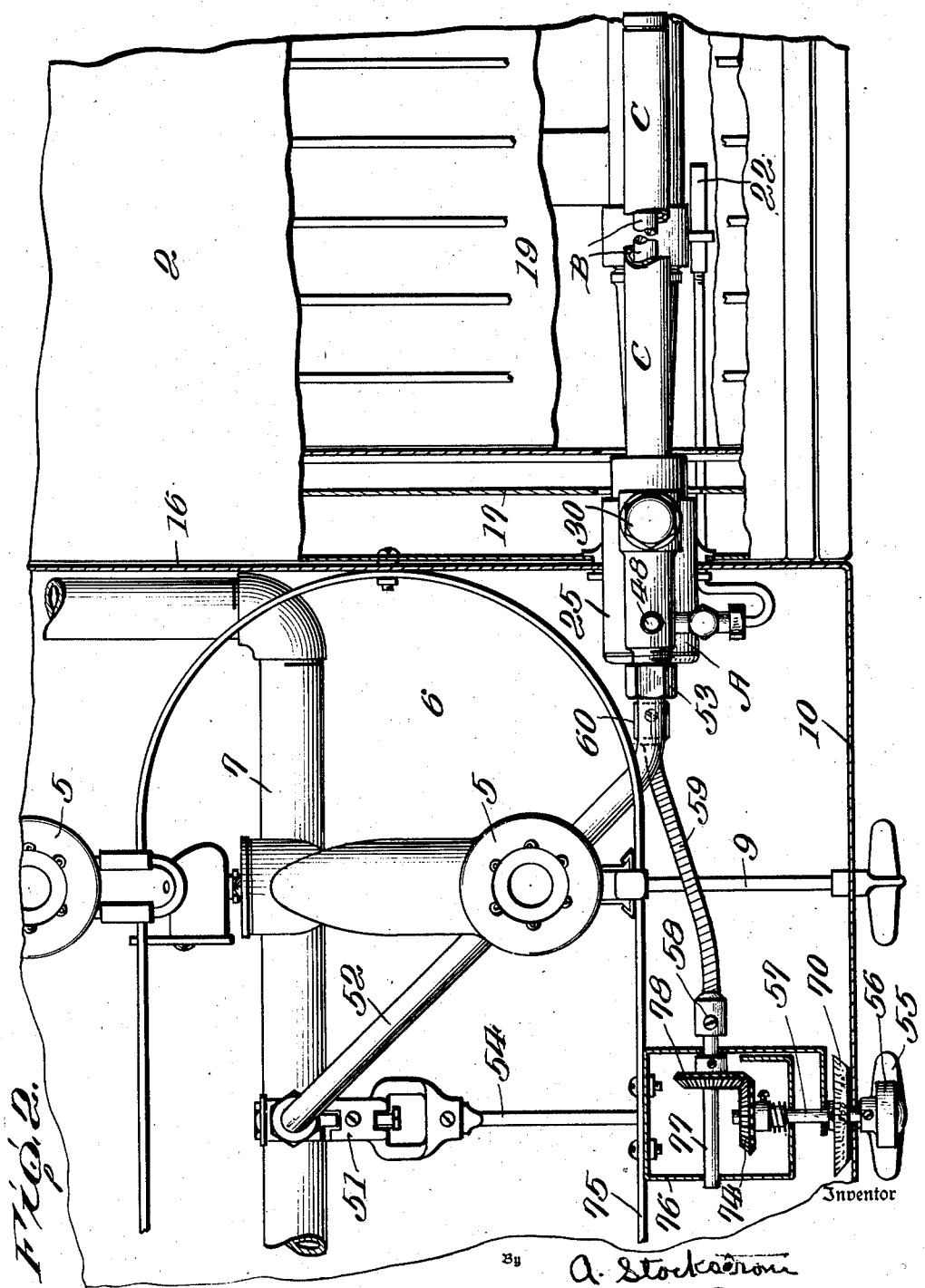

May 10, 1938.　　　A. STOCKSTROM　　　2,117,227
GAS RANGE
Filed Nov. 20, 1931　　　4 Sheets-Sheet 3
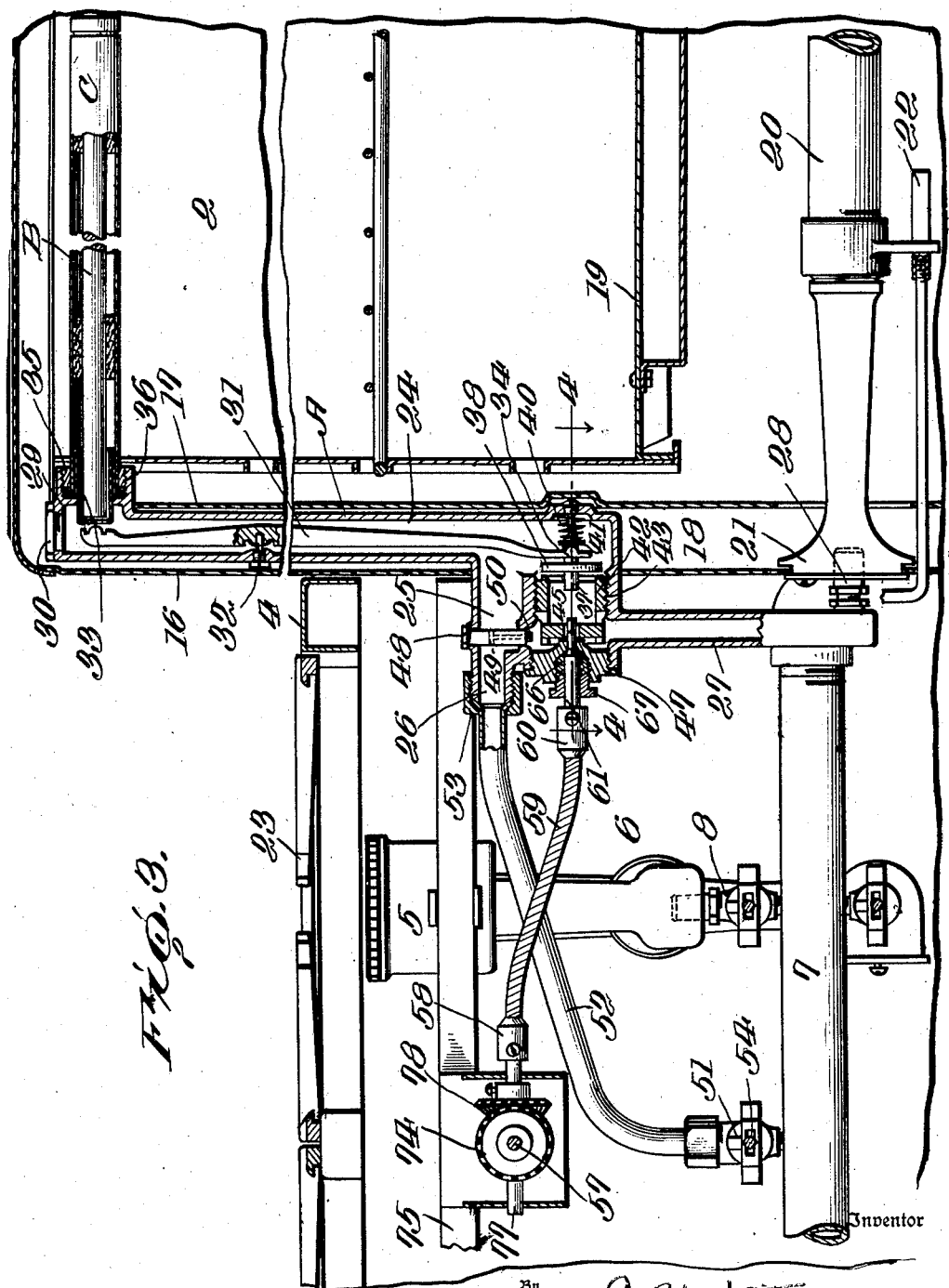
Inventor
A. Stockstrom
By Pattison, Wright & Pattison
Attorneys May 10, 1938.  A. STOCKSTROM  2,117,227
GAS RANGE
Filed Nov. 20, 1931  4 Sheets-Sheet 4
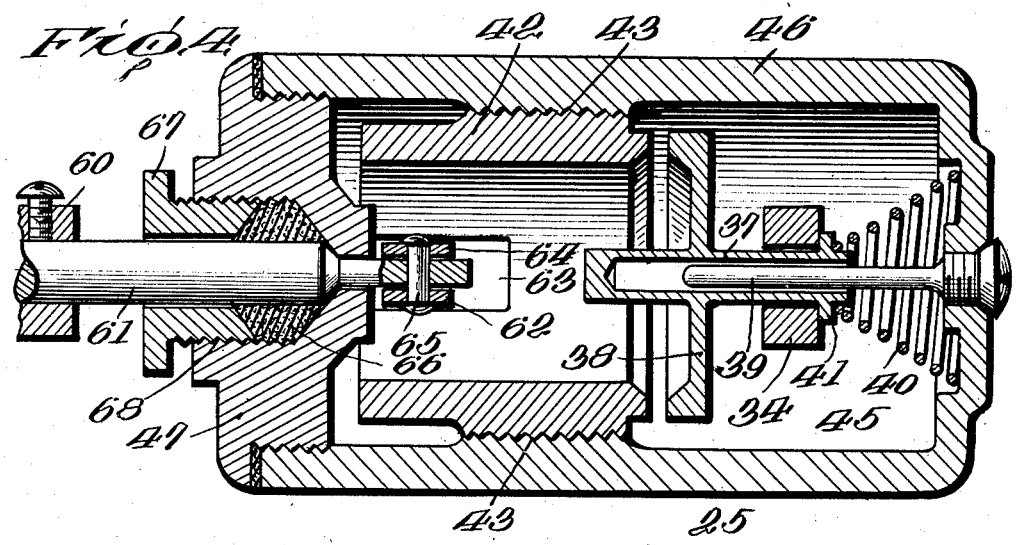
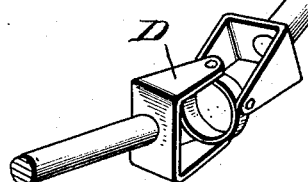
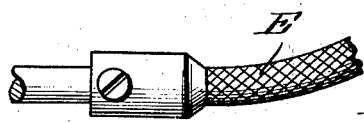
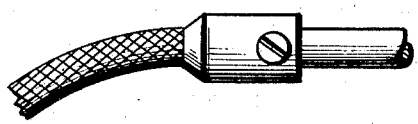
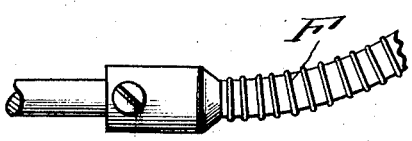
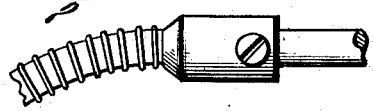
Inventor
By A. Stockstrom
Pattison, Wright & Pattison  Attorneys Patented May 10, 1938

2,117,227

UNITED STATES PATENT OFFICE 2,117,227

GAS RANGE

Arthur Stockstrom, St. Louis, Mo., assignor to American Stove Company, St. Louis, Mo., a corporation of New Jersey Application November 20, 1931, Serial No. 576,399

12 Claims. (Cl. 236—15)

This invention relates to improvements in gas ranges and is more particularly directed to a new and improved type of oven heat regulator for domestic cooking equipment.

The primary object of the invention is the provision of a new and improved type of oven heat regulator for use in conjunction with gas stoves of the concealed manifold type whereby the oven heat regulator and its auxiliary operating equipment is concealed from view.

A further object of the invention is the provision of a new and improved type of oven heat regulator of the type mentioned wherein there is provided novel means of connection between the oven heat regulator setting wheel and the regulator whereby the regulator and its auxiliary operating equipment, which is unsightly, can be concealed within the gas range.

A still further object of the invention is the provision of a new and improved type of oven heat regulator for accomplishing the purpose described which is suitable and applicable to ranges of different sizes and configurations by a simple and cheap change or alteration in the connection between the regulator proper and the regulator setting or adjusting mechanism.

Other and further specific features of novelty of the present invention together with additional advantages of the invention will appear from the following description taken in conjunction with the accompanying drawings.

In the drawings:

Figure 1 is a view in front elevation of a gas range of the concealed manifold type having applied thereto an oven heat regulator of the present improved type.

Fig. 2 is a fragmentary horizontal sectional view of the range illustrated in Figure 1 showing the manner of application of the improved heat regulator thereto.

Fig. 3 is a fragmentary vertical sectional view through the range illustrated in Figure 1 of the drawings.

Fig. 4 is a horizontal sectional view taken on the line 4—4 of Figure 3 looking in the direction indicated by arrow.

Fig. 5 is a vertical sectional view taken on the line 5—5 of Figure 1.

Fig. 6 is an enlarged fragmentary front view of a portion of the control panel of the range.

Fig. 7 is a perspective view of a modified form of connector used between the regulator and the heat control setting mechanism.

Fig. 8 is a modified form of the flexible connector for use between the regulator and the heat control setting mechanism.

Fig. 9 is a still further modified form of the flexible connector for use between the regulator and the heat control setting mechanism.

Describing the invention in detail with reference to the accompanying drawings wherein similar parts are designated by like reference numerals throughout the description, having particular reference to Figure 1 of the drawings it will be seen there is provided a gas range supported upon the usual legs 1 which comprises a pair of superimposed ovens 2 and 3 one of which is a baking oven and the other a broiling oven. Adjacent these ovens is positioned the open cooking top portion 4 of the range having of course beneath it a plurality of gas burners 5 positioned within the cooking top burner housing 6. These burners are supplied with fuel by the main gas conduit 7 and the delivery of fuel from the conduit to the burners is under the control of suitable valves 8 which are provided with elongated operating handles 9 which extend outwardly through the burner housing front panel 10 which conceals the burners, their valves and the gas supply conduit.

For the purpose of beautifying and lending enchantment to the appearance of the stove this burner housing front panel is in turn provided with a control panel portion 11 and all of the elongated valve handles 9 pass through this control panel 11 and are provided on the panel with valve operating handles 12.

Beneath the open cooking top burner housing the range is provided with a sliding drawer 13 for the reception and storage of utensils while immediately behind the cooking top the range is provided with a splash back or plate 14 above which at the rear of the cooking top is positioned a shelf 15.

Reference now being made particularly to Figure 2 of the drawings we see that the oven is provided with an outer wall 16 and an inner lining 17 providing between them a space 18 which in ordinary practice is filled with insulating material so that the oven may better retain its heat. The oven bottom is represented at 19 and beneath this is positioned the oven burner 20 having, as is usual, a mixing tube 21 through which the gas or fuel is delivered to the burner. There is also provided an oven burner pilot light or burner 22.

In the drawings the open cooking top portion of the range is illustrated as being provided with grids 23 over the cooking top burners, but it will be readily apparent that a solid top could be substituted for the grids without departing in any respects from the spirit of the invention.

The thermostatic control comprises a housing A which has its portion 24 positioned in the space 18 between the oven outer wall and inner lining while its portion 25 extends through the oven outer wall into the open cooking top burner chamber 6. This thermostatic housing portion 25 has formed with it a gas inlet 26 and an elongated gas outlet conduit 27 which in its lower end is provided with an outlet orifice or nozzle 28 which extends into the mixing tube 21 of the oven burner 20. The upper end 29 of the portion 24 of the housing is provided with an opening closed by a cap nut 30 by means of which access can be had to the interior of the housing.

A lever 31 fulcrumed intermediate its length at 32 extends throughout the length of the housing portion 24 and into the housing portion 25. The upper end of the lever is designated as 33 and the lower end 34 of the lever is bifurcated as clearly appears in Figure 4 of the drawings. The upper end 33 of the lever is adapted to be engaged by the end 35 of a porcelain rod B which is mounted within a copper tube C. The copper tube C in conjunction with the porcelain rod act as a thermostatic element and are supported by the collar 36 at the upper end of the housing portion 24 and extend across the oven top as clearly illustrated.

The lower bifurcated end 34 of the lever straddles the tubular hollow stem 37 of a valve 38 which valve is adapted for reciprocation upon a rod 39 against the tension of a coil spring 40 which bears against the enlarged end 41 of the valve stem 37 at one side of the enlarged end. The bifurcated end 34 of the lever is positioned at the other side of the enlarged end of the valve stem. The valve 38 is provided with a movable and adjustable seat 42 which is of a hollow tubular form and is exteriorly threaded as at 43 in the housing portion 25 which housing at this particular point is tubular in form to provide a supplemental housing 45 having an upper wall 46. The outer end of this tubular portion 45 is closed by a nut 47. This supplemental housing 45 has communication with the housing 25 and the gas inlet 26 through the valve 38 and is constantly in communication with the gas outlet 27, as is clearly apparent in Figure 3 of the drawings.

When the valve 38 is seated and normal communication between the chamber 45 with the gas inlet is closed a small and restricted communication between the gas inlet and the chamber or housing 45 is maintained by a hollow bolt 48 which has an inlet 49 communicating with the gas inlet 26 while its lower open end 50 is in communication with the interior of the chamber or housing 45. This hollow bolt 48 assures a small delivery of gas to the oven burner in so long as the oven gas valve 51 is open for the passage of gas from the main manifold 7 through the pipe 52 which is attached to the gas inlet 26 as illustrated at 53. This construction assures that as long as the gas valve 51 is open the oven burner will remain lighted even though the thermostatic control operates to close the valve 38 and thus shut off the main gas supply to the oven burner.

The oven burner gas valve is provided with an elongated operating rod 54 which is provided at the control panel 11 of the range with an operating handle 55.

It will of course be apparent that the thermostatic elements B and C in conjunction with the coil spring 40 operate the lever 31 to open and close the valve 38. When the thermostatic element is contracted it engages the upper end 33 of the lever 31 and rocks the lever upon its fulcrum to move the lower end of the lever and open the valve 38. When the thermostatic element is expanded the spring 40 will move the lower end of the lever in the reverse direction and close the valve 38.

In devices of this kind it is of course the practice to provide setting and control means for the operation of the thermostat whereby the thermostat can be set to shut off the supply of gas to the oven burner when the oven temperature has reached a predetermined degree of heat. In the present construction this adjustment and control of the thermostat is had through the adjustable valve seat 42. The heat at which the thermostat is to operate to close the valve 38 is determined by the position of the valve seat 42. To this end means are provided for revolving the valve seat 42 and moving it towards and away from the valve 38. The setting and control means for the thermostat is through a remote control in the form of a rotatable knob 56 carried on the control panel 11 at the front of the range. This knob rotates a stub shaft 58 which extends into the burner chamber of the open cooking top and at its end carries a bevel gear 74. A bar 75 which serves as a support for the open cooking top burners 5 also serves as a support for a bracket 76 which supports and steadies the shaft 57 and additionally supports a stub shaft 77 which extends at right angles to the shaft 57 and is provided with a bevel gear 78 which meshes the bevel gear 74. One end of a flexible cable 59 has connection as at 58 with the stub shaft 77 while its other end is attached as at 60 to a stub shaft 61 having a reduced end portion 62 which extends into the supplemental housing or chamber 45. The valve seat 42 is slotted as at 63 to receive the cross bar 64 which is riveted or otherwise suitably secured to the reduced end 62 of the stub shaft 61 as indicated at 65. By this arrangement it will be evident that the rotation of the knob 56 will rotate the valve seat 42 and permit the movement of the valve seat towards and away from the valve.

To prevent the escapage of gas from the chamber 45 the stub shaft 61 is surrounded with a packing 66 which is compressed by a packing nut 67 which likewise surrounds the stub shaft and threadedly engages the nut 47 at 68.

As it is essential for the operator of the range to determine the setting of the thermostat an indicator is provided in the form of a circular dial 69 carried by and rotatable with the shaft 57 as clearly indicated in Figure 5 of the drawings. In line with concealing every possible mechanical part of the range this dial is positioned behind the control panel 11 and the graduations 70, see Figure 6, which indicate the thermostatic setting are viewed through the opening 71 provided in the control panel. To lend appearance to the range the edges 72 of this opening are beveled inwardly and the upper edge is shaped to provide a pointer 73 to permit accurate setting of the dial.

From the foregoing it will be seen that a thermostatic control mechanism for the oven burner of the range is provided in which every part thereof with the exception of the setting knob and a slight portion of the setting dial is concealed from view, thus lending to the manufacture of a range of a most pleasing appearance. Furthermore by the use of a flexible connector between the setting dial and the adjustable valve seat the same setting dial and the same thermostat can be used for ranges of different sizes and different configurations by the substitution of flexible connectors of different lengths. This permits a material reduction in the cost of manufacture of gas ranges in that previously it has been necessary to manufacture an individual thermostat control for each individual model of gas range in that the different models vary as to size and configuration. That this is so will be readily understood when it is borne in mind that to provide a stove of balanced appearance it is necessary that the setting device for the various oven temperatures be centrally located on the control panel of the range. The flexible connection and operating mechanism herein provided permits this positioning with a standard and single form of thermostat.

In the preferred form of the invention as illustrated in Figures 2 and 3 of the drawings the flexible connector 59 is of the wrapped wire type such as is used and found in speedometer shafts, but other flexible connectors can be used without departing from the spirit of the invention and other types of flexible connectors are illustrated in Figures 7, 8 and 9 of the drawings.

In Figure 7 of the drawings a flexible connector of the universal joint type is illustrated at D and is of an inexpensive and simple construction.

Figure 8 illustrates a still further type of flexible connector and represents a woven or braided fine wire type E which will work satisfactorily with the device.

Figure 9 is still another representation of an additional type of flexible connector and illustrates a wrapped flexible metal tubing F which has also been found to work satisfactorily with the device.

Having thus described my invention what I claim and desire to secure by Letters Patent is:—

1. In a cooking range, an oven and a cooking top portion adjacent thereto having beneath it a closed housing, a thermostat and a control means therefor for controlling the oven temperature, said thermostat and its control means being completely concealed within the oven and the housing beneath the cooking top, an operating means for said thermostat control positioned externally of the range, and a rotary flexible shaft connecting said thermostat control and its operating means, for the purpose described.

2. In a cooking range, an oven and a cooking top portion adjacent thereto having beneath it a closed housing, a gas burner in the oven, a gas supply for said burner, a thermostat for controlling the oven heat temperature by controlling the supply of gas to said burner, a control element for controlling and determining the operation of said thermostat, said thermostat and its control element completely concealed within the oven and the housing beneath the cooking top, a setting means for said thermostat control positioned remote to the control and operable by means externally positioned on said range, and a rotary flexible shaft operatively connecting said thermostat control and its setting means, for the purpose described.

3. In combination with a chamber having a fuel burner therein, means for obtaining and maintaining a given temperature in said chamber comprising a unit composed of a thermostat and a controlling means therefor for controlling the supply of fuel to said burner, and a setting means for said controlling means and having a rotary flexible shaft connection therewith, whereby the positions of the temperature controlling unit and the setting means can be altered without altering the construction of either.

4. A thermostatic gas oven regulator, comprising a valve, a thermostat operatively connected thereto, a rotatably adjustable member remote from the valve, and means including a rotary flexible shaft so connecting the member and valve that the latter can be adjusted by rotating the former.

5. A thermostatic gas oven regulator, comprising a valve, a thermostat operatively connected thereto, a manually rotatable member remote from the valve, the rotary axis of the member being relatively angular to the longitudinal axis of the valve, and means including a rotary flexible shaft so connecting the member and valve that the latter can be adjusted by rotating the former.

6. A thermostatic gas oven regulator, comprising a valve, a thermostat operatively connected thereto at one side of the valve, a member connected to the valve at its opposite side, a manually rotatable member remote from the valve, and means including a rotary flexible shaft so connecting the two members that rotation of the second-named member manually adjusts the valve.

7. In combination with a stove having an oven and a gas burner therefor, a thermostatic regulator comprising a valve for controlling the gas to the burner, a thermostat operatively connected to the valve and extending into the oven, a manually rotatable member at the front of the stove and remote from the valve, and means including a rotary flexible shaft so connecting the member and valve that the latter can be adjusted by the former.

8. In combination with a stove having a plurality of burners at one section thereof and an oven and burner therefor at an adjacent section, a row of valves along the front of the stove for controlling the gas to the first-named burners, a valve for controlling the gas to the oven burner, a thermostat operatively connected to the valve and extending into the oven from one side wall thereof, a manually adjustable member adjacent to said valves at the front of the stove and remote from said oven burner valve, and rotary flexible means so connecting the member and valve that the latter can be adjusted by the former.

9. In combination, a plurality of open burners, a gas manifold extending along said burners and adapted for supplying gas thereto, an oven, a thermally operated device disposed within the oven, a controlling device disposed within the oven and in proximity to said thermally operated device, a selecting device adjacent the manifold and flexible rotatable means operatively connecting said selecting device and said controlling device.

10. The combination with an oven the temperature of which is to be controlled, of a thermostat having a non-rotating expansible tube extending across said oven from one side toward the other through a zone of average temperature, a burner zone adjacent said oven, a valve casing situated in said burner zone, a temperature adjusting screw threaded into said casing, a rotary flexible shaft secured to said screw for adjusting the same, and means outside of the burner compartment for rotating said shaft.

11. The combination with a range including a cooking top having a burner compartment therebelow, of an oven at one side of said cooking top, and an adjustable thermostat including heat responsive mechanism, a valve casing and control mechanism, said heat responsive mechanism being located within said oven, said casing being located within said burner compartment and said control mechanism being located exteriorly of said burner compartment and laterally of the oven, there being a rotary flexible operating shaft between said control mechanism and said heat responsive mechanism operatively connected thereto in substantial tangential relationship.

12. The combination with a range having an oven with a cooking top and burner compartment at one side thereof, of a thermostat of the rod and tube type located within said oven and having a valve casing exteriorly thereof within said burner compartment, of a free and unconfined rotary flexible shaft extending through said burner compartment for controlling said thermostat, and remote control means adjacent said cooking top for operating said shaft.

ARTHUR STOCKSTROM.